(12) United States Patent
Shanbhag et al.

(10) Patent No.: US 10,816,038 B1
(45) Date of Patent: Oct. 27, 2020

(54) PLASTIC SLEEVE ON SUPPORT BEARING

(71) Applicant: Schaeffler Technologies AG & Co. KG, Herzogenaurach (DE)

(72) Inventors: Rajesh Shanbhag, Troy, MI (US); Tyler Boger, Farmington Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/417,816

(22) Filed: May 21, 2019

(51) Int. Cl.
| | |
|---|---|
| *F16C 35/077* | (2006.01) |
| *F16D 3/223* | (2011.01) |
| *F16D 3/06* | (2006.01) |
| *B60K 17/24* | (2006.01) |

(52) U.S. Cl.
CPC .......... *F16D 3/223* (2013.01); *F16D 3/065* (2013.01); *B60K 17/24* (2013.01); *F16C 2326/06* (2013.01)

(58) Field of Classification Search
CPC .......... F16C 19/52; F16C 33/76; F16C 33/78; F16C 33/782; F16C 33/7823; F16C 33/7826; F16C 33/7889; F16C 35/077; F16C 2326/06; F16C 33/783; F16C 33/7859; F16C 33/7863

USPC .......................................................... 384/476
See application file for complete search history.

(56) References Cited

U.S. PATENT DOCUMENTS

| | | | | |
|---|---|---|---|---|
| 5,961,222 A | * | 10/1999 | Yabe | F16C 19/52 384/476 |
| 5,975,764 A | * | 11/1999 | Okada | F16C 19/52 384/476 |
| 6,422,947 B1 | * | 7/2002 | Kelly | F16C 35/077 464/182 |
| 8,425,120 B2 | * | 4/2013 | Konno | F16C 19/52 384/476 |
| 9,581,203 B2 | * | 2/2017 | White | F16C 41/002 |
| 2003/0086630 A1 | * | 5/2003 | Bramel | F16C 19/163 384/476 |
| 2013/0300187 A1 | * | 11/2013 | Konrad | B60B 27/0005 301/105.1 |
| 2015/0049972 A1 | * | 2/2015 | Sasaki | F16C 33/7846 384/484 |
| 2016/0363170 A1 | * | 12/2016 | Nakata | F16C 33/805 |

FOREIGN PATENT DOCUMENTS

JP          10037949 A   *   2/1998   ............. F16C 33/60

* cited by examiner

*Primary Examiner* — Phillip A Johnson
(74) *Attorney, Agent, or Firm* — Volpe Koenig

(57) ABSTRACT

A sleeve is provided on a seal seat of a bearing ring, for example an outer bearing ring of a propshaft bearing. The sleeve receives a bearing seal in an interference fit.

14 Claims, 2 Drawing Sheets

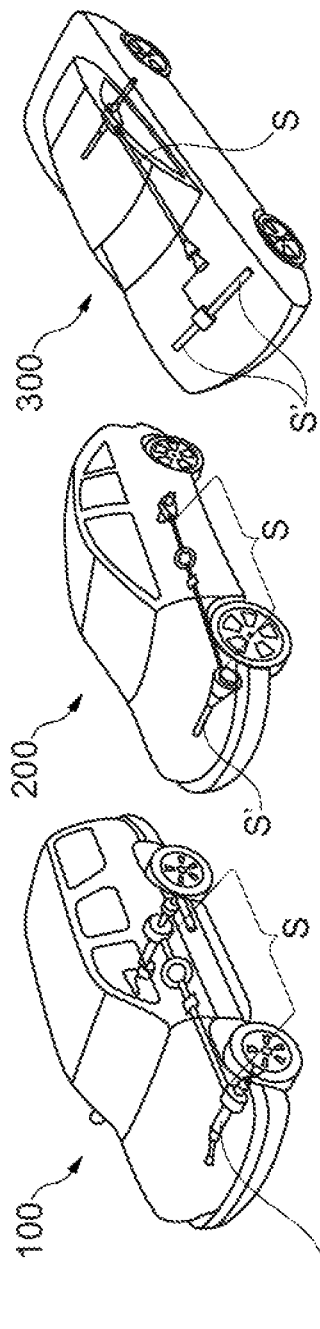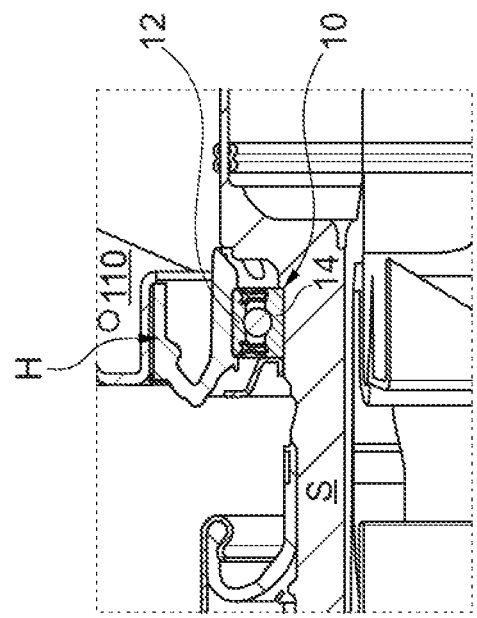

PLASTIC SLEEVE ON SUPPORT BEARING

FIELD OF INVENTION

The present invention relates to a bearing assembly, and, more particularly, to a contamination resistant bearing with a sleeve on a seal seat of a bearing ring.

BACKGROUND

Rolling bearings are widely used in various mechanical applications, including automotive and industrial applications. Seals are used between bearing rings to prevent some forms of contamination from penetrating to the interior of a bearing. In exterior vehicle applications, such as a bearing for a propeller shaft ("propshaft") or other driveshaft, there is a constant risk of contamination due to splashing rain, snow, mud, and the like. Support bearings for these shafts may attempt to prevent contamination under these operating conditions. Some current designs utilize seals having various shapes and features such as flingers. However, corrosion can overcome such seals. For example, contaminants can pool at the interface between the outer ring and housing. This leads to corrosion of a bearing ring's seal seat and, over time, propagation past the typical seal.

SUMMARY

The present disclosure is directed to overcoming these and other problems of the prior art, including simplifying assembly, lowering costs, and minimizing space. The present disclosure is directed to a support bearing solution which is integrated with a ring of the rolling bearing and utilizes the interference fit of the bearing seal.

In one aspect, the present disclosure is directed to an outer ring assembly for a bearing of a vehicle propshaft having an outer ring and a plastic sleeve. The outer ring includes a race for receiving a rolling element, a contact surface for engaging a seal, an axially outer face, and a radially outer surface. The plastic sleeve covers at least the contact surface for receiving a seal with an interference fit.

In another aspect, the present disclosure is directed to a bearing assembly. The bearing assembly includes a rolling bearing assembly having a first ring with a first race, a second ring with a second race, a plurality of rolling elements, a seal, and a sleeve. The plurality of rolling elements is in rolling contact with the first and second races. The seal includes a first end in contact with the first ring and a second end engaging the second ring. The sleeve is mounted to the second ring, wherein the seal is interference fit with the sleeve.

BRIEF DESCRIPTION OF THE DRAWING(S)

The foregoing Summary and the following detailed description will be better understood when read in conjunction with the appended drawings, which illustrate a preferred embodiment of the invention. In the drawings:

FIG. 1A is a perspective view of a propshaft and related drive assemblies for a sport utility vehicle (SUV) with architecture for rear wheel drive (RWD), all-wheel drive (AWD), or 4-Wheel Drive (4WD);

FIG. 1B is a perspective view of a shafts and related drive assemblies for a crossover utility vehicle (CUV) with architecture for front wheel drive (FWD) or AWD;

FIG. 1C is a perspective view of a propshaft and related drive assemblies for an automobile with RWD or AWD;

FIG. 2 is a perspective view of a shaft supporting assembly for mounting in a vehicle;

FIG. 3 is a partial cross-sectional view of the shaft supporting assembly of FIG. 2 and a shaft mounted in a vehicle;

DETAILED DESCRIPTION OF THE PREFERRED EMBODIMENT(S)

Figure 4:
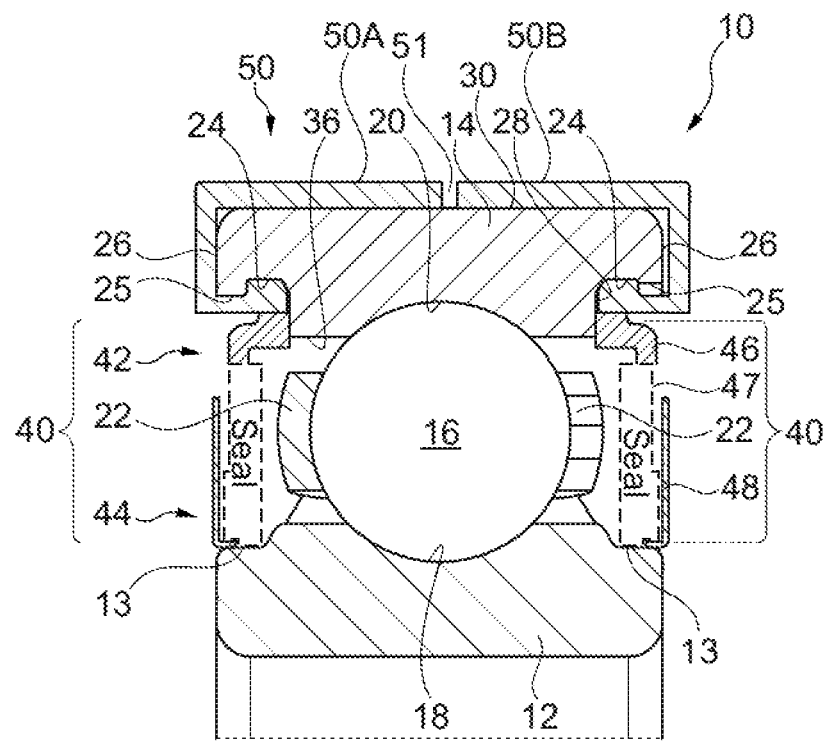
FIG. 4 is a is a partial cross-sectional view of a bearing assembly applicable to the shaft supporting assembly of FIG. 3.

The present disclosure relates to a protective sleeve which is added to a ring and integrated with the sealing assembly of a bearing in order to prevent corrosion of the ring surface. The sleeve is mounted to a ring of the bearing, and the seal or sealing assembly engages with both the outer ring and the inner ring, functioning to seal between the rings.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import. The terms "engage" or "engaging" refer to structures being effectively mounted together even if a sleeve 50 (or a coating, washer, or similar structure) intervenes between the structures as disclosed herein.

Referring to FIGS. 1A-1C, exemplary driveshaft arrangements applicable to the present application are shown. One skilled in the art would recognize that the present disclosure is applicable to a variety of vehicle drive shafts S, including a propshaft, link-shaft, half-shaft, or other such drive shaft. Any such applicable shafts are labeled S. In particular, a SUV 100 (or light truck) may have RWD architecture with a rear propshaft S or AWD/4WD architecture with rear and front shafts S, S. A CUV 200 (also applicable to many passenger cars) may have FWD architecture with power transmission via a link shaft or half-shafts S' or an AWD architecture adding a rear shaft S (typically in two or three pieces). A passenger car 300 may have RWD architecture with a rear propeller shaft S (typically in two pieces) or an AWD architecture adding a front shaft.

As shown in FIGS. 2 and 3, a shaft S (that is, either a shaft S or half shaft S') attaches to the vehicle by way of a bearing assembly 10, which is mounted to a housing H and a bracket 110. The bracket 110 has mounting flanges 112 for bolting or otherwise attaching to the frame of the vehicle 100/200/300. In an exemplary embodiment, the housing H is made of a rubber, such as an over-molded stamping, with an outer ring 14 of the bearing assembly press-fit into the housing. In other applications, the housing H may be formed of various other materials. The shaft S is press-fit into an inner ring 12 of the bearing assembly.

FIG. 4 illustrates an exemplary embodiment of a bearing assembly 10 applicable to the present disclosure for supporting a shaft S. The bearing assembly 10 includes a first ring which may be a radially inner ring 12, a second ring which may be a radially outer ring 14, and a plurality of bearing elements 16 supported to roll on a radially inner race 18 of the radially inner ring 12 and a radially outer race 20 of the radially outer ring 14. The bearing elements 16 are preferably balls, but could include other configurations, such as needles, cylindrical rollers, tapered rollers, or spherical/barrel shaped rollers. The bearing assembly 10 further includes a cage 22 for the bearing elements 16.

Axial sides of the bearing assembly 10 each include a sealing assembly 40 extending between the radially inner ring 12 and the radially outer ring 14. To form a seal, a first end 42 of the sealing assembly 40 engages the outer ring 14 via a sleeve 50 as discussed below. As illustrated, an outer portion 46 of the sealing assembly 40 is located at the first end 42 and a flinger 48 may be provided. The flinger 48 aids in removing debris.

The particular geometry of the interface between the sealing assembly 40 and the radially inner ring 12 are not pertinent to the present disclosure; as such, this inner portion 47 of the sealing assembly is shown schematically. The inner portion 47 may include part of the flinger 48. Generally speaking for the purposes of the present application, the inner ring 12 includes contact surfaces 13 which generally oppose the outer ring 14. A second end 44 of the sealing assembly 40 is positioned for contact with the contact surfaces 13 in order to form a seal at the interface of the sealing assembly 40 and the radially inner ring 12.

The radially outer ring 14 may include a groove 24 and a ledge formed at each axial side. The groove 24 and ledge 25 may collectively be considered a "contact surface" of the outer ring 14. The grooves 24 and the ledges 25 are inward-facing (i.e., facing toward a center axis of the inner 12 and outer 14 rings). The grooves 24 may extend from an axially inner face 28 positioned relatively nearer the bearing element 16 toward an axially outer face 26 of the outer ring 14. In alternative embodiments without the groove 24, the ledge 25 would extend to the axially inner face 28 and constitute the entire contact surface. The sealing assembly 40 may have an interference fit with the inner ring 12 and with the sleeve 50 (and thus engaging the outer ring 14). The sealing assembly 40 may allow slight flexure to compensate for relative axial and radial displacement between the inner ring 12 and the outer ring 14, which maintains the seal between the rings. Such design features ensure constant contact during usage, even when under loading or shock.

Figure 5:
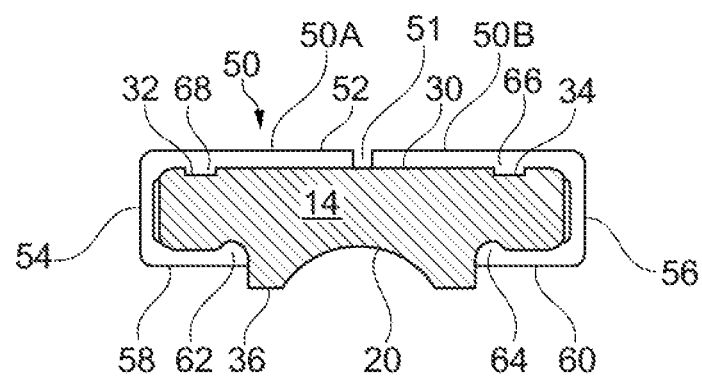
FIG. 5 is a cross-sectional view of an outer ring and sleeve of the bearing assembly of FIG. 4.

As shown in FIGS. 4 and 5, a sleeve 50 is mounted to the ring 14 of the bearing assembly 10. In the exemplary embodiment, the sleeve 50 is mounted to the outer ring 14, although the sleeve may be mounted to either or both of the rings 12, 14. The sleeve 50 is designed to prevent corrosion; as such it is preferably formed of a plastic material. The sleeve 50 has a thickness and material properties (e.g., hardness) sufficient to protect the outer ring 14 and exhibit durability to last throughout the shaft S useful life.

The sleeve 50 is formed of a first sleeve part 50A and a second sleeve part 50B with a gap 51 therebetween. As illustrated in FIGS. 4 and 5, the first and second sleeve parts 50A, 50B may be equally sized with the gap 51 midway along an outer surface 30 of the outer ring 14. The first sleeve part 50A covers a first axial end of the outer ring 14 (left side in FIGS. 4 and 5) and the second sleeve part 50B covers a second axial side of the outer ring 14 (right side in FIGS. 4 and 5). One skilled in the art would appreciate that the gap 51 could be offset at any point along the outer surface 30.

In the illustrated embodiment, the sleeve 50 includes a base 52, extensions 54, 56, and arms 58, 60 which are all dimensioned to closely fit around the outer ring 14. Flanges 62, 64 may extend from the arms 58, 60 into the grooves 24 to provide a positive hold of the sleeve 50 on the outer ring 14. In some embodiments, the flanges 62, 64 may fit tightly within the grooves 24 or extend partially into the grooves 24. In other embodiments, the flanges 62, 64 may extend substantially axially without positively engaging the grooves 24. As shown in FIG. 5, the outer ring 14 may have one or more notches 32, 34 and the sleeve 50 may have corresponding tabs 66, 68 designed to fit tightly within the notches. With the above structures, the sleeve 50 (i.e., both of the sleeve parts 50A and 50B) remains aligned on the outer ring 14 without any shifting or slipping.

In alternative embodiments, the sleeve 50 may be integrally formed of one piece of material, with sufficient elasticity to mount to the outer ring 14 with a snap-on fit. In this manner, the sleeve 50 may be mounted to the outer ring 14 before assembling with the rest of the bearing assembly 10. For example, to mount the sleeve 50, first the flange 62, arm 58, and/or extension 54 may engage the outer ring, and then subsequently the rest of the sleeve 50 (base 52, extension 56, extension 56, arm 60, and flange 64) may snap over and around the outer ring 14. This single sleeve 50 could also be provided in a liquefied state and subsequently solidified, for example by vulcanization, onto the outer ring 14.

The particular plastic material of the sleeve 50 applicable to the present disclosure may be a conventional sealing material, such as a plastic, polymer, or elastomer.

The disclosed sealing assembly 40 provides the above advantages of inhibiting contamination, even corrosive contamination, due to the plastic material of the sleeve. This is accomplished without redesigning the bearing rings, adding significant bulk to the rolling bearing assembly 10, or complicating the assembly process. The sleeve 50 is added to the outer ring 14 during assembly and is held by a snap fit. The disclosed sleeve 50 is significantly thicker than a coating and as such will last longer.

While the radially outer ring 14 is described as including the grooves 24 and the radially inner ring 12 is described as having the contact surfaces 13, it should be understood that these features may be reversed or the groove 24 may be omitted in whole or in part. For example, the grooves 24 may be formed in an outwardly-facing surface of the radially inner ring 12.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. Although the sleeve 50 is disclosed as a separate part attached to the ring 14, it may instead be provided as a coating of one or more layers applied directly to the relevant surfaces (i.e., at least the groove(s) 24 and optionally the ledge(s) 25, the axially outer face(s) 26, the outer surface 30, and some or all of the axially inner face(s) 28 of the bearing ring. It is also to be appreciated that numerous embodiments incorporating only part of the preferred embodiment are possible which do not alter, with respect to those parts, the inventive concepts and principles embodied therein. For example, instead of a bearing for an automotive propshaft, link-shaft, half-shaft, or drive shaft, the principles of the present disclosure may be applied to bearings for various other shafts and axles. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Bearing Assembly
12. Inner Ring
13. Contact Surfaces
14. Outer Ring
16. Bearing Elements
18. Inner Race
20. Outer Race
22. Cage
24. Groove
25. Ledge
26. Axially Outer Face
28. Axially Inner Face
30. Radially Outer Surface
32. Notch
34. Notch
36. Inner Surface
40. Sealing Assembly
42. First End
44. Second End
46. Outer Seal Portion
47. Inner Seal Portion
48. Flinger
50. Sleeve
50A. First Sleeve Part
50B. Second Sleeve Part
51. Gap
52. Base
54. Extension
56. Extension
58. Arm
60. Arm
62. Flange
64. Flange
66. Tab
68. Tab
100. SUV
110. Bracket
112. Mounting flange
200. CUV
300. Automobile S. Shaft
S'. Half Shaft
H. Housing

What is claimed is:

1. An outer ring assembly for a bearing of a vehicle propshaft, comprising:
    an outer ring, including:
        a race for receiving a rolling element,
        a contact surface for engaging a seal,
        an axially outer face, and
        a radially outer surface; and
    a corrosion-resistant sleeve covering at least the contact surface for receiving a seal with an interference fit, the corrosion-resistant sleeve having a first sleeve part and a second sleeve part separated by a gap.

2. The outer ring assembly of claim 1, wherein the first sleeve part covers a first axial end of the outer ring and the second sleeve part covers a second axial end of the outer ring.

3. The outer ring assembly of claim 1, wherein the radially outer surface has a notch, and the corrosion-resistant sleeve has a tab for mounting in the notch.

4. The outer ring assembly of claim 1, wherein the corrosion-resistant sleeve includes a base covering the outer surface, an extension covering the axially outer face, and an arm covering the contact surface.

5. The outer ring assembly of claim 1, wherein the outer ring includes a second contact surface and a second axially outer face, and wherein the corrosion-resistant sleeve covers both the contact surface and the second contact surface.

6. The outer ring assembly of claim 5, wherein the radially outer surface has a notch, and the corrosion-resistant sleeve has a tab for mounting in the notch.

7. The outer ring assembly of claim 6, wherein the contact surface defines a groove.

8. The outer ring assembly of claim 7, wherein the corrosion-resistant sleeve includes a flange mounted in the groove.

9. The outer ring assembly of claim 8, wherein the flange is sized and shaped to substantially mate within the groove.

10. The outer ring assembly of claim 9, wherein the corrosion-resistant sleeve is configured to snap onto the outer ring.

11. A rolling bearing assembly, comprising:
    a first ring including a first race;
    a second ring including a second race;
    a plurality of rolling elements in rolling contact with the first and second races;
    a sleeve mounted to the second ring, the sleeve being comprised of a first sleeve part and a second sleeve part separated by a gap; and
    a seal including a rigid flinger in interference fit with the first ring and a compliant portion in interference fit with the sleeve.

12. The rolling bearing assembly of claim 11, wherein the first sleeve part covers a first axial end of the outer ring and the second sleeve part covers a second axial end of the outer ring.

13. The rolling bearing assembly of claim 11, wherein the sleeve is plastic.

14. The outer ring assembly of claim 11, wherein a radially outer surface of the second ring has a notch, and the sleeve has a tab for mounting in the notch.

* * * * *